(12) United States Patent
Ishihara

(10) Patent No.: US 6,956,584 B2
(45) Date of Patent: Oct. 18, 2005

(54) IMAGE PROCESSING METHOD, IMAGE PROCESSING APPARATUS, IMAGE OUTPUT APPARATUS AND STORAGE MEDIUM

(75) Inventor: Hiroshi Ishihara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 449 days.

(21) Appl. No.: 10/300,586

(22) Filed: Nov. 21, 2002

(65) Prior Publication Data

US 2003/0112254 A1 Jun. 19, 2003

(30) Foreign Application Priority Data

Nov. 26, 2001 (JP) .................................. 2001-359449

(51) Int. Cl.$^7$ .................................................. G09G 5/00
(52) U.S. Cl. .................. 345/620; 345/619; 345/623; 345/624; 345/625
(58) Field of Search ...................... 345/619, 620, 345/623, 624, 625

(56) References Cited

U.S. PATENT DOCUMENTS

| | | |
|---|---|---|
| 4,758,965 A | 7/1988 | Liang et al. |
| 5,444,834 A | 8/1995 | Kai |
| 5,966,136 A | 10/1999 | Kurtz et al. |
| 6,288,724 B1 | 9/2001 | Kumar et al. |
| 6,424,430 B1 * | 7/2002 | Bilodeau et al. ............. 358/1.2 |

FOREIGN PATENT DOCUMENTS

| | | |
|---|---|---|
| EP | 0 402 161 | 12/1990 |
| EP | 0 964 367 | 12/1999 |
| JP | 2000-149036 | 5/2000 |

* cited by examiner

Primary Examiner—Matthew C. Bella
Assistant Examiner—Tam Tran
(74) Attorney, Agent, or Firm—Dickstein Shapiro Morin & Oshinsky LLP

(57) ABSTRACT

An image processing method converts line vectors of an input graphic path and an input clip path into run sets in dot coordinates passed by the line vectors, and generates a region run describing a closed region represented by the entire path from the run sets, so as to obtain a graphic region run and a clip region run, and extracts an overlapping portion of the graphic region run and the clip region run to generate a plot region run. The scan line conversion and the clipping form a rasterizing process.

31 Claims, 12 Drawing Sheets

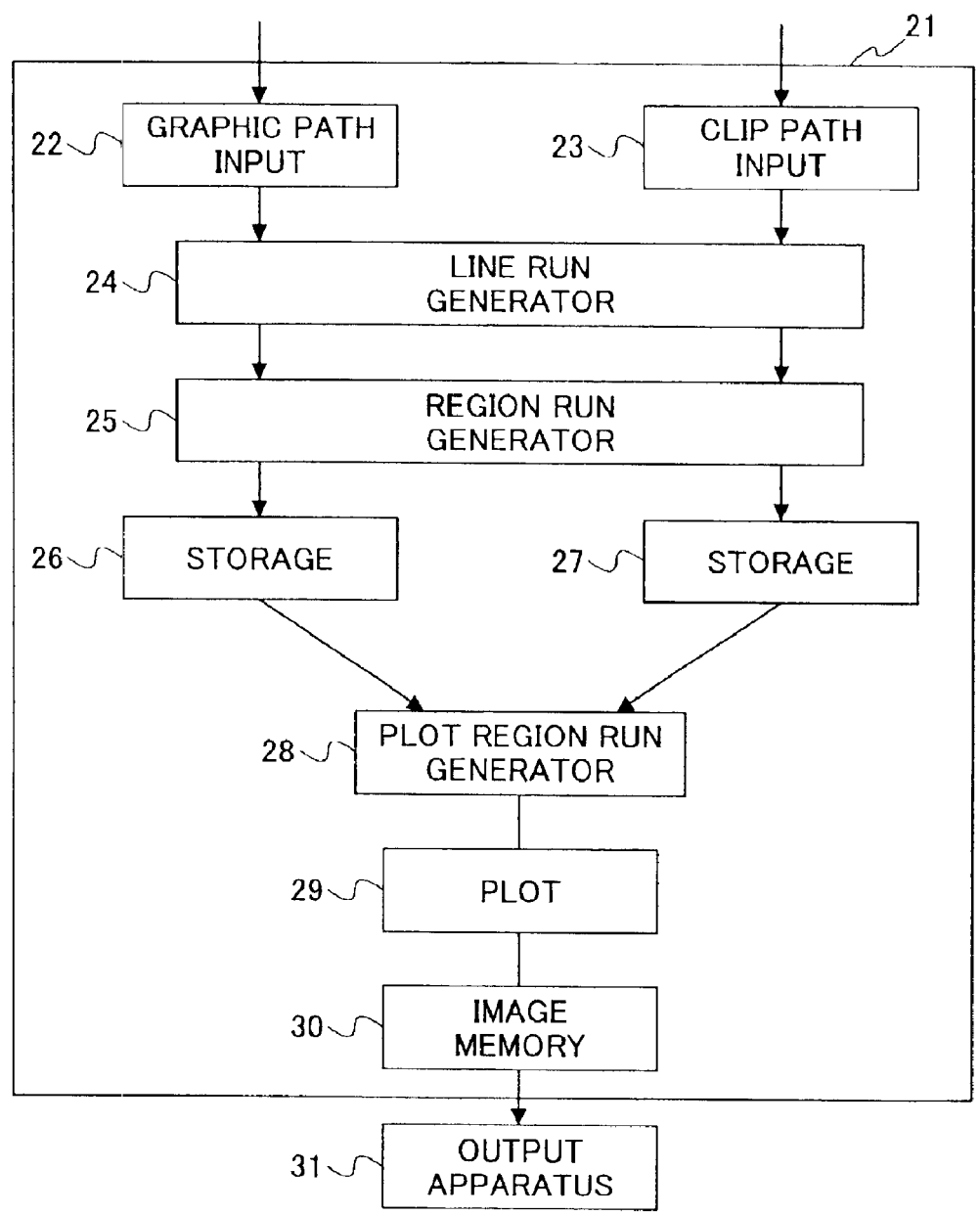

| LINE RUN | |
|---|---|
| RUN SET (SX, EX, Y) | Y DIRECTION |
| (5, 5, 8) | DOWNWARD |
| (4, 5, 7) | |
| (4, 4, 6) | |
| (3, 4, 5) | |
| (2, 3, 4) | |
| (2, 2, 3) | |
| (1, 2, 2) | |
| (1, 1, 1) | |
| (1, 1, 0) | |

FIG.7

| Y | L |
|---|---|
| 8 | L1, L3 |
| 7 | L1, L3 |
| 6 | L1, L3 |
| 5 | L1, L3 |
| 4 | L1, L3 |
| 3 | L1, L3 |
| 2 | L1, L3, L2 |
| 1 | L1, L2 |
| 0 | L1, L2 |

| RUN SET (SX, EX, Y) |
|---|
| (5, 5, 8) |
| (4, 6, 7) |
| (4, 7, 6) |
| (3, 8, 5) |
| (2, 9, 4) |
| (2, 9, 3) |
| (1, 10, 2) |
| (1, 7, 1) |
| (1, 3, 0) |

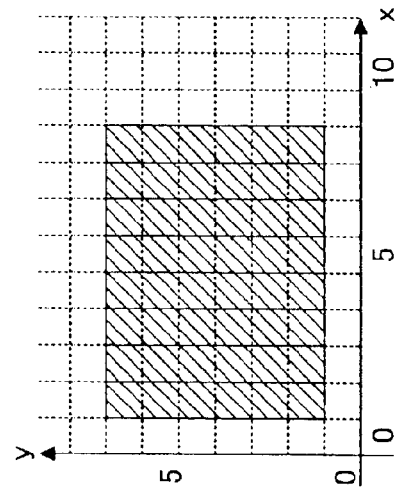
FIG.10B
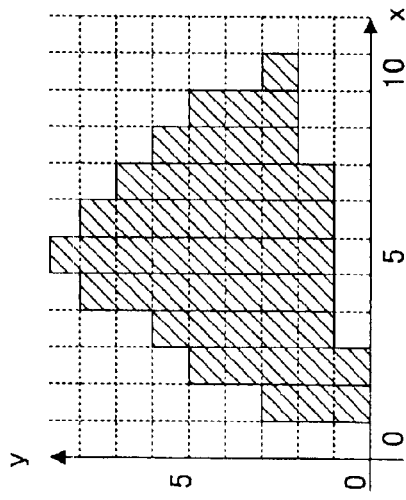
FIG.10A
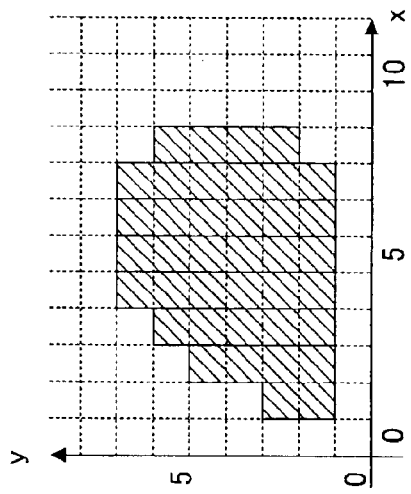
FIG.10C
FIG.10D
| RUN SET (SX, EX, Y) |
|---|
| (4, 7, 6) |
| (3, 8, 5) |
| (2, 8, 4) |
| (2, 8, 3) |
| (1, 8, 2) |
| (1, 7, 1) |

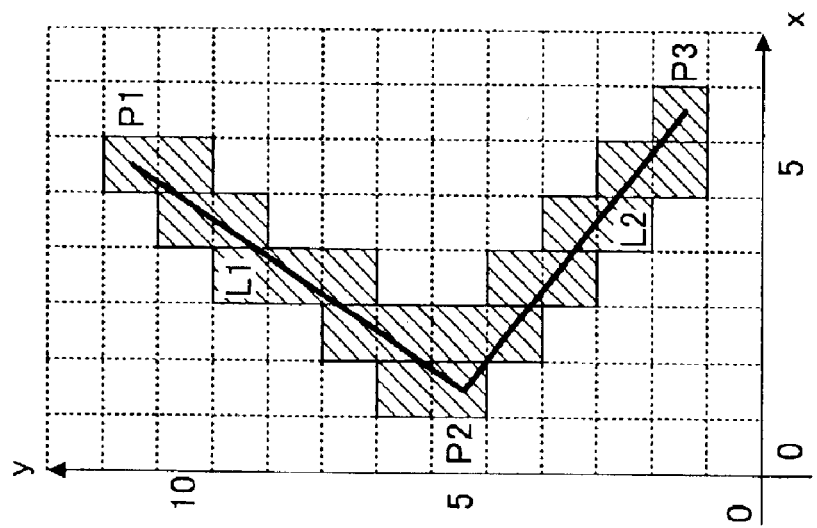

IMAGE PROCESSING METHOD, IMAGE PROCESSING APPARATUS, IMAGE OUTPUT APPARATUS AND STORAGE MEDIUM

BACKGROUND OF THE INVENTION

This application claims the benefit of a Japanese Patent Application No. 2001-359449 filed Nov. 26, 2002, in the Japanese Patent Office, the disclosure of which is hereby incorporated by reference.

1. Field of the Invention

The present invention generally relates to image processing methods, image processing apparatus, image output apparatus and storage media, and more particularly to an image processing method for processing graphics and the like to be output to image output apparatus such as a printer and a display unit, an image processing apparatus and an image output apparatus which employ such an image processing method, and a computer-readable storage medium which stores a program for causing a computer to process images using such an image processing method.

2. Description of the Related Art

Recently, in personal computers (PCs), applications such as graphic design applications often process graphics having arbitrary shapes using free straight lines and free curves. In order to output such graphics to an image output apparatus such as a printer and a display unit, a coordinate transformation is required to transform real number coordinates or vector coordinates describing the graphics into integer coordinates. Generally, this transformation process is called a scan conversion or a scan line conversion.

In addition, a "clipping" is often made in such applications. The "clipping" sets an arbitrary graphic for specifying a plot effective range. In this case, an overlapping portion between a clip region and a graphic region becomes an output graphic.

The above described processing of the graphics require a long processing time, and in recent personal computers, a hardware called a graphic accelerator is used to perform the processing of the graphics.

FIG. 1 is a system block diagram showing an example of a conventional image processing apparatus which performs the above described processing of the graphics. An image processing apparatus 1 shown in FIG. 1 includes a graphic path input section 2, a clip path input section 3, a plot path generator 4, a plot region run generator 8, a plot section 9, and an image memory 9. An output of the image processing apparatus 1 is supplied to an image output apparatus 11 such as a printer and a display unit.

A graphic path of the graphic to be plotted is input to the graphic path input section 2, and a clip path is input to the clip path input section 3. A "path" refers to a vector set of a plurality of straight lines connected at end points, and one path is formed by connecting a starting point of a first straight line and a terminating point of a last straight line. One path describes an arbitrary polygonal closed region. The input path is a single path or, is formed by a plurality of paths in the case of a path which includes another path as in the case of a donut-shaped graphic, for example.

In order to obtain an overlapping portion between the closed regions which are specified by the graphic path which is input to the graphic path input section 2 and the clip path which is input to the clip path input section 3, the plot path generator 4 generates a new path which surrounds the overlapping portion from the graphic path and the clip path.

In a case where the graphic path is a triangle shown in FIG. 2A and the clip path is a rectangle shown in FIG. 2B, the new path surrounding the overlapping portion becomes a hexagon shown in FIG. 2C. This new path is generated by obtaining positional relationships such as inclusion, exclusion and partial inclusion (intersection) between the graphic path and the clip path, and carrying out calculations such as obtaining intersecting coordinate points in the case of the partial inclusion.

The new path generated by the plot path generator 4 is subjected to a scan line conversion in the plot region run generator 8, and a run generated by the plot region run generator 8 is plotted by the plot section 9 and stored in the image memory 10. The run stored in the image memory 10 is output to the image output apparatus 11.

On the other hand, a Japanese Laid-Open Patent Application No. 2000-149036 proposes a graphic processing method which interprets a plot instruction, converts the interpreted plot instruction into a straight line vector (hereinafter referred to as a "line vector") in a vector data generator, and generates by a display list generator a display list indicating plot elements and a display list indicating clip elements for restricting a plot region of the plot elements. Linear information included in the display lists is vector information having X-coordinates in real number coordinates. An intersecting point of the X real number coordinates and Y integer coordinates is calculated, and the X real number coordinates are sorted to obtain integer coordinates.

The image processing apparatus 1 shown in FIG. 1 has a problem in that a long processing time is required at a stage where the plot path generator 4 generates the new path surrounding the overlapping portion between the graphic path and the clip path.

On the other hand, the graphic processing method proposed in the Japanese Laid-Open Patent Application No. 2000-149036 has problems in that real number calculations are required up to a time immediately prior to the plotting, and the processing speed is slow.

SUMMARY OF THE INVENTION

Accordingly, it is a general object of the present invention to provide a novel and useful image processing method, image processing apparatus, image output apparatus and storage medium, in which the problems described above are eliminated.

Another and more specific object of the present invention is to provide an image processing method, an image processing apparatus, an image output apparatus and a storage medium, which can subject a graphic path and a clip path to a scan line conversion at an initial stage, and carry out subsequent processes by performing integer computations using runs, so that a high-speed image processing is possible.

Still another object of the present invention is to provide an image processing method comprising a step inputting an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region; a scan line conversion step converting line vectors of the input graphic path and the input clip path into run sets in dot coordinates passed by the line vectors, and generating a region run describing a closed region represented by the entire path from the run sets, so as to obtain a graphic region run for the graphic path and a clip region run for the clip path; and a clipping step extracting an overlapping portion of the graphic region run and the clip region run, and generating a plot region run for a plot path, where the scan line conversion step and the clipping step carry out a rasterizing process. According to the image processing method of the present invention, it is possible to subject the graphic path and the clip path to a scan line conversion at an initial stage, and carry out subsequent processes by performing integer computations using runs, so that a high-speed image processing is possible.

A further object of the present invention is to provide an image processing apparatus comprising an input section inputting an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region; a scan line conversion section converting line vectors of the input graphic path and the input clip path into run sets in dot coordinates passed by the line vectors, and generating a region run describing a closed region represented by the entire path from the run sets, so as to obtain a graphic region run for the graphic path and a clip region run for the clip path; and a clip section extracting an overlapping portion of the graphic region run and the clip region run, and generating a plot region run for a plot path, where the scan line conversion section and the clip section carry out a rasterizing process. According to the image processing apparatus of the present invention, it is possible to subject the graphic path and the clip path to a scan line conversion at an initial stage, and carry out subsequent processes by performing integer computations using runs, so that a high-speed image processing is possible.

Another object of the present invention is to provide an image output apparatus comprising an input section inputting an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region; a scan line conversion section converting line vectors of the input graphic path and the input clip path into run sets in dot coordinates passed by the line vectors, and generating a region run describing a closed region represented by the entire path from the run sets, so as to obtain a graphic region run for the graphic path and a clip region run for the clip path; a clip section extracting an overlapping portion of the graphic region run and the clip region run, and generating a plot region run for a plot path, the scan line conversion section and the clip section carrying out a rasterizing process; a memory; and a plot section plotting and storing the plot region run in the memory in the form of bit map data according to plot attribute information including colors, as output image data. According to the image output apparatus of the present invention, it is possible to subject the graphic path and the clip path to a scan line conversion at an initial stage, and carry out subsequent processes by performing integer computations using runs, so that a high-speed image processing is possible.

Still another object of the present invention is to provide a computer-readable storage medium which stores a program for causing a computer to carrying out an image processing, the program comprising a procedure causing the computer to input an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region; a scan line conversion procedure causing the computer to convert line vectors of the input graphic path and the input clip path into run sets in dot coordinates passed by the line vectors, and generate a region run describing a closed region represented by the entire path from the run sets, so as to obtain a graphic region run for the graphic path and a clip region run for the clip path; and a clipping procedure causing the computer to extract an overlapping portion of the graphic region run and the clip region run, and generate a plot region run for a plot path, where the scan line conversion procedure and the clipping procedure cause the computer to carry out a rasterizing process. According to the computer-readable storage medium of the present invention, it is possible to subject the graphic path and the clip path to a scan line conversion at an initial stage, and carry out subsequent processes by performing integer computations using runs, so that a high-speed image processing is possible.

Other objects and further features of the present invention will be apparent from the following detailed description when read in conjunction with the accompanying drawings.

BRIEF DESCRIPTION OF THE DRAWINGS

FIG. 3 is a system block diagram showing an embodiment of an image processing apparatus according to the present invention;

FIG. 7 is a diagram for explaining a transition of an active line table (ALT);

FIGS. 10A, 10B, 10C and 10D are diagrams for explaining a graphic region run, a clip region run and a plot region run;

FIGS. 11A and 11B are diagrams for explaining a process of converting 2 line vectors having the same Y-coordinate direction into 1 line run.

DESCRIPTION OF THE PREFERRED EMBODIMENTS

Figure 1:
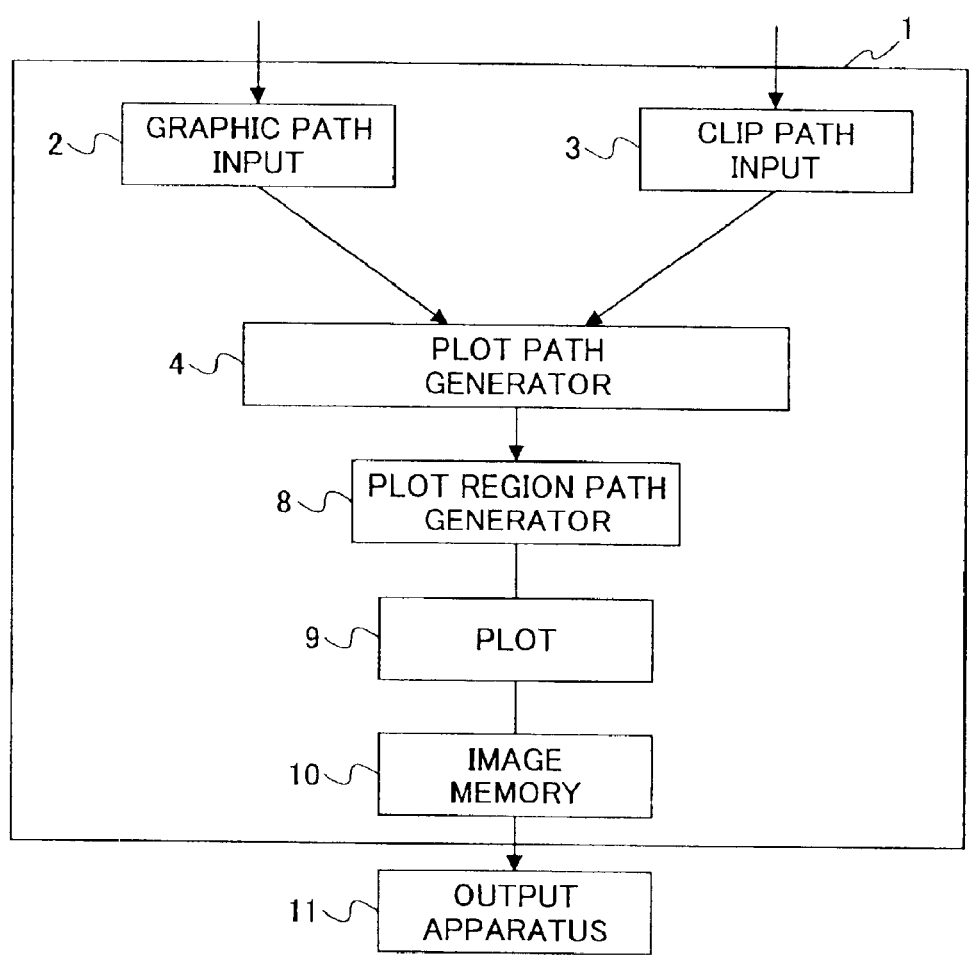
FIG. 1 is a system block diagram showing an example of a conventional image processing apparatus which performs processing of graphics.
Figure 2A:
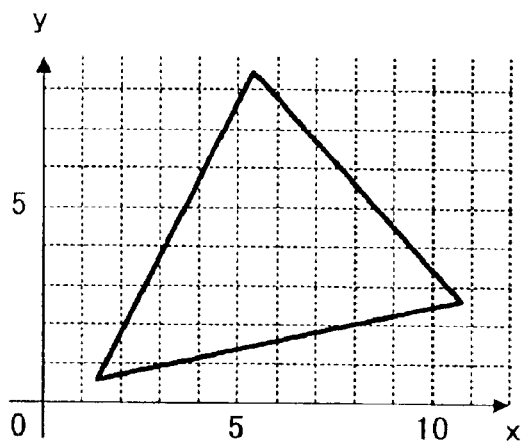
FIGS. 2A, 2B and 2C are diagrams for explaining the processing of graphics in the conventional image processing apparatus shown in FIG. 1.
Figure 2B:
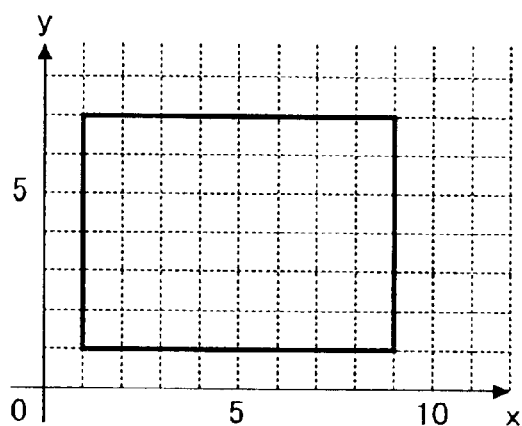
Figure 2C:
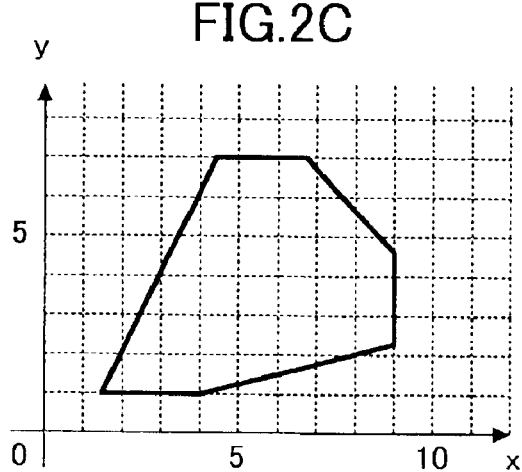

FIG. 3 is a system block diagram showing an embodiment of an image processing apparatus according to the present invention. This embodiment of the image processing apparatus employs an embodiment of an image processing method according to the present invention.

An image processing apparatus 21 shown in FIG. 3 includes a graphic path input section 22, a clip path input section 23, a line run generator 24, a region run generator 25, a graphic region run storage 26, a clip region run storage 27, a plot region run generator 28, a plot section 29, and an image memory 30. An output of the image processing apparatus 21 is supplied to an image output apparatus 31 such as a printer and a display unit.

A graphic path of the graphic to be plotted, indicating a shape of the graphic, is input to the graphic path input section 22. A clip path indicating a shape of a plot effective range is input to the clip path input section 23. A "path" refers to a vector set of a plurality of straight lines connected at end points, and one path is formed by connecting a starting point of a first straight line and a terminating point of a last straight line. One path describes an arbitrary polygonal closed region. The input path is a single path or, is formed by a plurality of paths in the case of a path which includes another path as in the case of a donut-shaped graphic, for example.

The line run generator 24 converts the line vectors of the graphic path input to the graphic path input section 22 and the clip path input to the clip path input section 23 into run sets in the dot coordinates passed by the line vectors. The region run generator 25 generates a run set (hereinafter referred to as a "region run") describing a closed region represented by the entire path, from the run sets obtained by the line run generator 24. The graphic region run storage 26 stores the region run for graphic path (hereinafter referred to as a "graphic region run") generated by the region run generator 25. The clip region run storage 27 stores the region run for clip path (hereinafter referred to as a "clip region run") generated by the region run generator 25.

The plot region run generator 28 extracts an overlapping portion of the graphic region run stored in the graphic region run storage 26 and the clip region run stored in the clip region run storage 27, and generates a region run for plot path (hereinafter referred to as a "plot region run"). The plot region run generated by the plot region run generator 28 is plotted by the plot section 29 and stored in the image memory 30. The run stored in the image memory 30 is output to the image output apparatus 11.

Next, a description will be given of the operation of this embodiment. For the sake of convenience, it is assumed that the graphic path is input to the graphic path input section 22 in a state where all coordinates are within the clip range and no clip path is specified.

Figure 4:
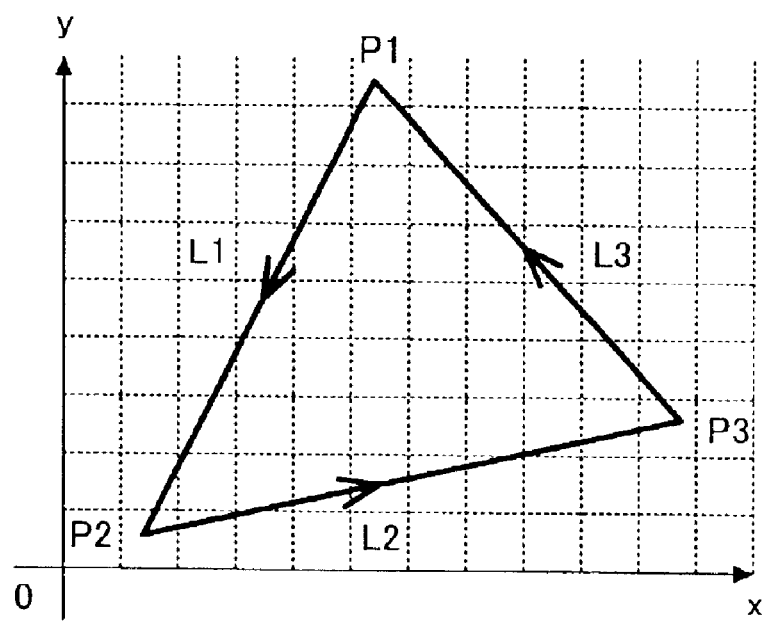
FIG. 4 is a diagram showing a graphic path.

For example, the graphic path input to the graphic path input section 22 is made up of 3 straight lines L1, L2 and L3 as shown in FIG. 4. FIG. 4 is a diagram showing the graphic path input to the graphic path input section 22. The vector coordinates of points P1, P2 and P3 which determine the 3 straight lines L1, L2 and L3 are represented by real number coordinates (x, y), where variables indicating the real number coordinates are denoted by x and y. This graphic path specifies the region which is to be subjected to a plotting process using specified colors and a plotting technique such as ROP, and represents the font shape, the graphics and the like.

The line vectors L1(P1, P2), L2(P2, P3) and L3(P3, P1) of the graphic path input to the graphic path input section 22 are converted by the line run generator 24 into the run set in the dot coordinates passed by the line vectors L1(P1, P2), L2(P2, P3) and L3(P3, P1). For the sake of convenience, variables indicating the integer coordinates are denoted by X and Y. The run set is a set of range (SX, EX, Y) from an integer coordinate SX of a starting point of an X-coordinate in an arbitrary Y integer coordinate to an integer coordinate EX of a terminating point. For the sake of convenience, a straight line described by the run set is referred to as a "line run". Each of the line vectors forming the graphic path is converted from the real number coordinates of the path coordinates into the integer coordinates of the line run.

Figures 5A, 5B:
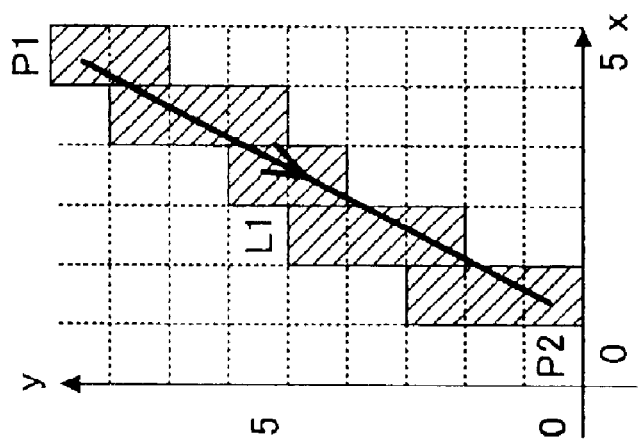
FIGS. 5A and 5B are diagrams for explaining a line run.

FIGS. 5A and 5B are diagrams for explaining the line run. FIG. 5A shows the line run which is obtained by carrying out a DDA conversion with respect to the line vector L1(P1, P2) shown in FIG. 4, and FIG. 5B shows the run set and the Y direction of the line run. Various techniques may be used for the DDA conversion, and in this embodiment, it is assumed for the sake of convenience the DDA conversion simply obtains the coordinates at least including a straight line. Of course, other techniques may be used for the DDA conversion. For Y=5, for example, the run (including the terminating point) has a range of 2 dots from the starting point SX=3 to the terminating point EX=4. Moreover, accessory information indicating "downward direction" as the Y direction of the line vector L1(P1, P2) is inherited to the line run as shown in FIG. 5B for use during the processing in the region run generator 25 of the subsequent stage.

Figure 6:
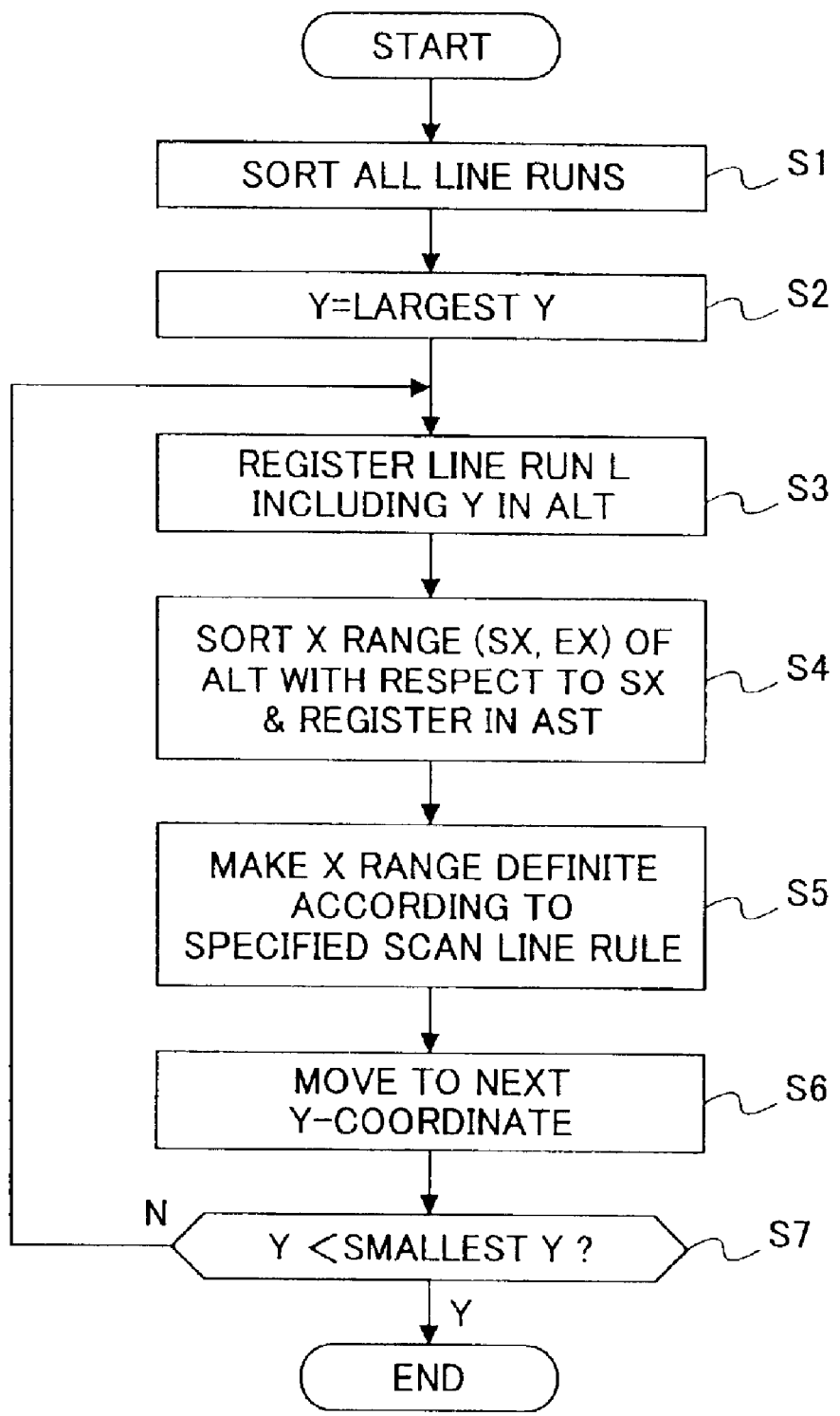
FIG. 6 is a flow chart for explaining a region run generating process.

When all vectors of the graphic path are converted into the line run, the region run generator 25 generates the region run which is a run set describing a closed region represented by the entire graphic path. A description will be given of the process of generating this region run, by referring to FIG. 6. FIG. 6 is a flow chart for explaining the region run generating process.

First, a step S1 shown in FIG. 6 sorts each of the line runs according to the larger Y-coordinate of each of the line runs. For example, when the sorting is made with respect to the line runs corresponding to the graphic path shown in FIG. 4, the sorted runs become L1, L3, L2 in this order because the end point P1 (Y=8) has the larger Y-coordinate for the line vector L1(P1, P2), the end point P3 (Y=2) has the larger Y-coordinate for the line vector L2(P2, P3), and the end point P1 (Y=8) has the larger Y-coordinate for the line vector L3(P3, P1). A step S2 sets an initial value of a target Y-coordinate line to a largest Y-coordinate among all of the line runs. In the case shown in FIG. 4, the Y-coordinate value (Y=8) of the line vector L1(P1, P2) appearing first is set as the initial value of the target Y-coordinate line, because this Y-coordinate value (Y=8) is the largest Y-coordinate obtained after the sorting in the step S1.

A step S3 registers a line run L including the target Y-coordinate in an active line table (ALT). The ALT may be provided within the region run generator 25 or, externally to the region run generator 25. Because all of the line runs are sorted by the Y-coordinates in the step S1, the registration simply needs to be made in the sorted order, and it is possible to reduce the load on the registering process. For example, in the case of the Y-coordinate value Y=8 which is first subjected to the registering process, 2 line runs are registered in the ALT because the line vectors L1 (P1, P2) and L3 (P3, P1) include Y=8. FIG. 7 is a diagram for explaining a transition of the ALT when Y is successively decremented by 1 from 8 to 0.

A step S4 sorts the X range (SX, EX) of the line run L registered in the ATL with respect to the starting point SX, and registers the sorted result in an active segment table (AST). The AST may be provided within the region run generator 25 or, externally to the region run generator 25. When Y=2, for example, the line runs L1, L3 and L2 are registered in the ALT, and the X ranges (SX, EX) of the line runs L1, L3 and L2 respectively are L1(1, 2), L3(10, 10) and L2(7, 10). When these X ranges L1(1, 2), L3(10, 10) and L2(7, 10) are sorted with respect to the starting point SX, the sorted result becomes L1(1, 2), L2(7, 10), L3(10, 10), and the sorted result L1(1, 2), L2(7, 10), L3(10, 10) is registered in the AST in this order.

The sorted result, that is, the data registered in the AST, is denoted by (SX, EX, DY), and a line segment direction DY which indicates the Y direction of the line segment is also registered. The line segment direction DY takes a value "1" when indicating the upward direction in which the Y-coordinate becomes larger, a value "−1" when indicating a downward direction in which the Y-coordinate becomes smaller, and takes a value "0" when the line segment is parallel to the Y axis and the Y-coordinate does not change.

The line segment direction DY is used for the following process. When the X range to be registered in the AST is adjacent to or overlaps the X range which is already registered in the AST and the direction information of the 2 X ranges are the same, the 2 X range data are combined. When combining the 2 X range data, the range data is changed to a range which includes the other range data, and the line segment direction DY is not changed. For example, when (SX, EX, DY)=(1, 2, −1) of the line vector L1 and (SX, EX, DY)=(10, 10, 1) of the line vector L2 are already registered in the AST and (SX, EX, DY)=(7, 10, 1) of the line vector L2 is to be registered in the AST, the X ranges of the registered line vector L3 and the line vector L2 to be registered overlap, and the line segment direction DY of the registered line vector L3 and the line vector L2 to be registered are the same. Hence, in this case, the line vectors L2 and L3 are combined. As a result, the 2 range data (1, 2, −1) and (10, 10, 1) are registered in the AST. By combining the range data having the same direction information, it is possible to treat as a single line run 2 line runs of 2 straight lines which have the Y direction which does not change and are connected to the vertex included in the target integer Y-coordinates, as in the case of the point (vertex) P3 shown in FIG. 4.

Returning now to the description of FIG. 6, a step S5 uses the X ranges registered in the AST and makes the X ranges definite according to a specified scan line rule. The scan line rule may be one of a non-zero winding rule and an even-odd rule. According to the non-zero winding rule, the X range is defined in a case where a total of intersecting line segment directions DY is non-zero when scanning the Y-coordinates of a scan line from left to right. On the other hand, according to the even-odd rule, the X range is defined in a case where a number of intersecting line segments is an odd number regardless of the line segment direction DY. For example, when the triangle shown in FIG. 4 is converted according to the non-zero winding rule, the AST stores the X ranges (1, 2, −1) and (10, 10, 1) of 2 line runs for Y=2, the total of intersecting line segment directions DY for the X range less than equal to 0 is 0 (initial value), the total of intersecting line segment directions DY for the X range between 1 and 10 is −1, and the total of intersecting line segment directions DY for the X range of 11 or greater is 0. Hence, the X range in this case is defined as between 1 and 10 because the total of intersecting line segment directions DY therefor is −1 which is non-zero when the triangle shown in FIG. 4 is converted according to the even-odd rule, the X range is also defined as between 1 and 10 because the total of intersecting line segments therefor is an odd number. Therefore, the result of the conversion is the same for the non-zero winding rule and the even-odd rule when the number of line segments is 2.

After the effective X range at the target Y-coordinate is made definite, a step S6 moves to the next Y-coordinate, that is, the Y-coordinate which is 1 line below. A step S7 decides whether or not the target Y-coordinate is smaller than a minimum Y-coordinate. If the decision result in the step S7 is NO, the process returns to the step S3 to repeat the above described process. On the other hand, the process ends if the decision result in the step S7 is YES.

Figures 8A, 8B:
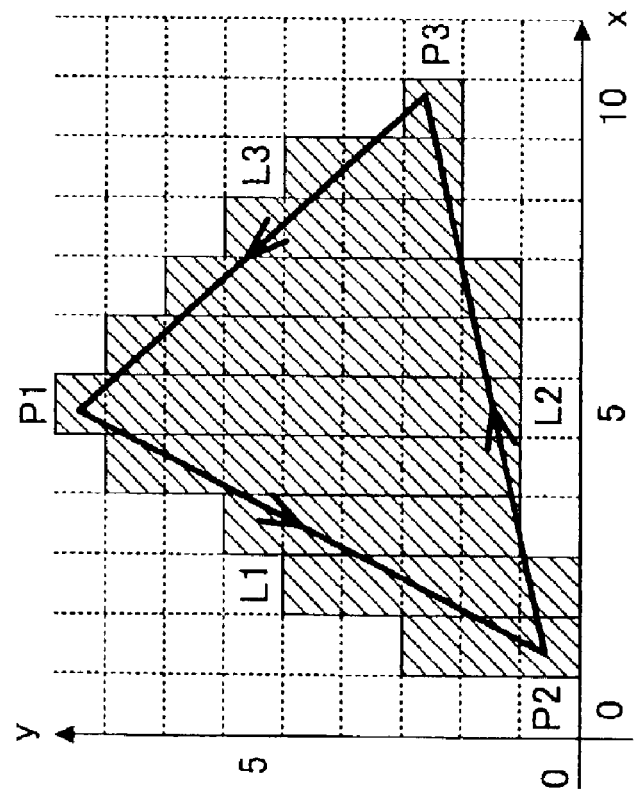
FIGS. 8A and 8B are diagrams for explaining graphic and region run obtained as a result of processing the graphic path.

FIGS. 8A and 8B are diagrams for explaining the graphic and the region run obtained as a result of processing the graphic path shown in FIG. 4 in the manner described above. FIG. 8A shows the graphic, and FIG. 8B shows the run set thereof. The graphic region run is stored in the graphic region run storage 26. Since no clip path is specified in this case, the plot region run generator 28 regards the graphic region run stored in the graphic region run storage 26, as it is, as the plot region run. In addition, the plot section 29 carries out a plotting process with respect to a corresponding region of the image memory 30 using the plot region run generated by the plot region run generator 28 and plot attribute information such as the colors and the ROP. When carrying out the plotting process with respect to the image memory 30, it is possible to employ a data compression because the amounts of information related to the line run and the region run are large compared to that of vector information which can make a representation using only the starting and terminating points. Moreover, since both the line run and the region run are run sets, it is possible to employ a run compression and expansion technique such as MMR. The run stored in the image memory 30 is output to the image output apparatus 31 in response to an end of a plot instruction or in response to an output instruction.

Next, a description will be given of the operation of this embodiment for a case where a clip path is specified.

Figures 9A, 9B:
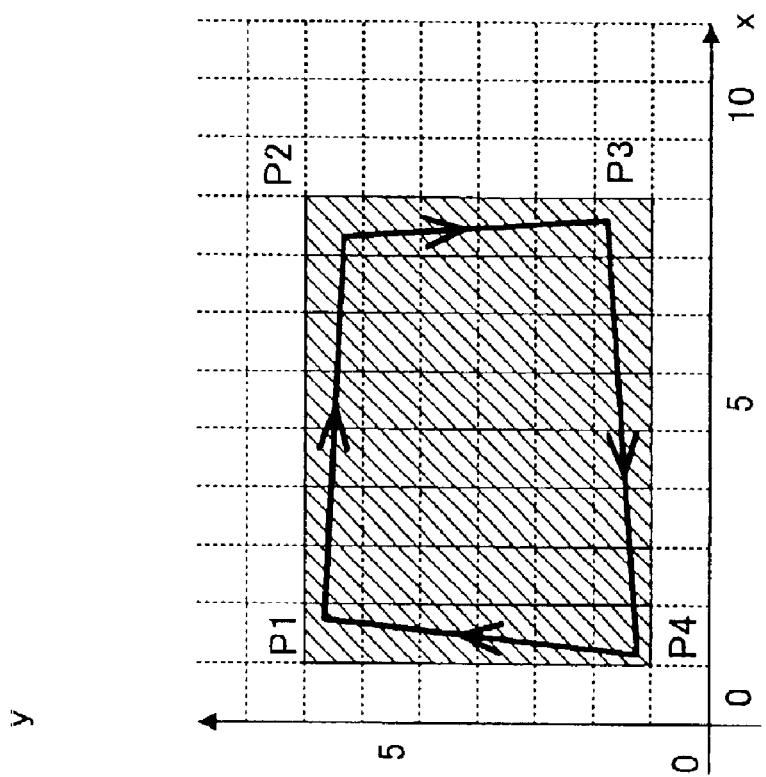
FIGS. 9A and 9B are diagrams for explaining a clip path.

FIGS. 9A and 9B are diagrams for explaining the clip path. FIG. 9A shows the flip path, and FIG. 9B shows the run set thereof. When the clip path of 4 line segments (sides) connecting the points P1, P2, P3 and P4 as shown in FIG. 9A is input to the clip path input section 23, the line run generator 24 converts the clip path into the line run, similarly to the conversion of the graphic path. Then, the region run generator 25 converts the line run into the region run, similarly to the conversion of the line run which is converted from the graphic path. The region run which is generated by the region run generator 25 corresponds to a rectangular region indicated in hatching in FIG. 9A, and FIG. 9B shows the coordinates of the run set for this particular case. The region run generated by the region run generator 25 is stored in the clip region run storage 27.

In the case of the clip path, the process ends when the clip region run generated by the region run generator 25 is stored in the clip region run storage 27, and the image processing apparatus 21 prepares to process the subsequent input of the graphic path. By storing the clip region run until a clip path is input the next time, it is possible to re-use the stored clip region run during the subsequent processing of the graphic region run.

When the graphic path is input to the graphic path input section 22 subsequent to the storage of the clip region run in the clip region run storage 27, the plot region run generator 28 extracts an overlapping portion between the graphic region run stored in the graphic region run storage 26 and the clip region run stored in the clip region run storage 27, so as to obtain a plot region run.

FIGS. 10A, 10B, 10C and 10D are diagrams for explaining the graphic region run, the clip region run and the plot region run. FIG. 10A shows the graphic region run for the graphic shown in FIG. 8A, and FIG. 10B shows the clip region run generated from the clip path shown in FIG. 9A. FIG. 10C shows the plot region run obtained from the graphic region run shown in FIG. 10A and the clip region run shown in FIG. 10B. FIG. 10D shows the run set of the clip region run show in FIG. 10C.

By comparing the Y-coordinate range of the clip region run shown in FIG. 10B and the Y-coordinate range of the graphic region run shown in FIG. 10A and judging whether or not an overlapping portion exists therebetween, it is possible to judge that no plot region run is to be generated if no overlapping portion exists. In addition, in a case where the graphic region run does not need to be stored after the plotting process, the graphic region run storage 26 may be used to store the generated plot region run by overwriting the plot region run in the graphic region run storage 26. On the other hand, in a case where the graphic region run needs to be stored after the plotting process, such as when a re-plotting process or the like occurs, a memory (not shown) may be provided separately from the graphic region run storage 26 to store the generated plot region run. This memory may be provided within the plot region run generator 28 or, externally to the plot region run generator 28.

The plot section 29 carries out a plotting process with respect to a corresponding region of the image memory 30 using the plot region run generated by the plot region run generator 28 and the plot attribute information such as the colors and the ROP. The run stored in the image memory 30 is output to the image output apparatus 31 in response to the end of the plot instruction or in response to the output instruction.

Next, a description will be given of a process of converting a plurality of line vectors having the same Y-coordinate direction into a single line run, by referring to FIGS. 11A and 11B. FIGS. 11A and 11B are diagrams for explaining the process of converting 2 line vectors having the same Y-coordinate direction into 1 line run. FIG. 11A shows the line vectors, and FIG. 11B shows the run set and the Y direction of the line run.

For example, suppose that the 2 line vectors are the line vector L1(P1, P2) and the line vector L2(P2, P3) having the downward direction with respect to the Y-coordinates as shown in FIG. 11A. In this case, the line run is first generated with respect to each of the line vectors L1(P1, P2) and L2(P2, P3). The 2 line runs which are generated overlap in only the Y-coordinates including the intersecting point P2. Hence, the portion of the Y-coordinates (Y=6 to 11), excluding a terminating run (run including P2) of L1, becomes the resulting line run as it is. Similarly, the portion of the Y-coordinates (Y=1 to 4), excluding a starting run of L2, becomes the resulting line run as it is.

In order to combine the X ranges of the starting and terminating points of the terminating run of L1 including P2 and the starting run of L2, which are Y-coordinate runs, the smaller one of the starting point X and the larger one of the terminating point are respectively regarded as the starting point X and the terminating point X of the combined run. In FIGS. 11A and 11B, the terminating run of L1 is (SX, EX)=(1, 1), the starting run of L2 is (SX, EX)=(1, 2), and the combined run is (SX, EX,)=(1, 2). Since both the line vectors L1(P1, P2) and L2(P2, P3) have the same Y-coordinate direction, no undesirable effects are introduced in subsequent processes even when the 2 line vectors L1(P1, P2) and L2(P2, P3) are converted into a single line run.

Of course, the present invention is not limited to combining 2 line vectors into a single line run, and the number of line vectors to be combined may be arbitrary as long as the line vectors are in the same Y-coordinate direction. By combining the plurality of line vectors into the single line run, it is possible to reduce the number of line runs to be processed in the region run generator 25, thereby enabling a high-speed processing in the image processing apparatus 21.

Therefore, the image processing carried out by the image processing apparatus 21 includes a rasterizing process which is suited for rasterizing graphic data of an arbitrary graphic, so as to store bit map data of the arbitrary graphic in the image memory 30. This rasterizing process includes a scan line conversion carried out by the line run generator 24 and the region run generator 25, and a clipping carried out by the plot region run generator 28 using the graphic region run storage 26 and the clip region run storage 27.

The scan line conversion converts line vectors of an input graphic path and an input clip path into run sets in the dot coordinates passed by the line vectors, and generates a run set (region run) describing a closed region represented by the entire path, from the run sets obtained. As a result, a graphic region run and a clip region run are obtained and stored.

On the other hand, the clipping extracts an overlapping portion of the graphic region run and the clip region run, and generates a plot region run.

A plotting may be carried out by the plot section 29 to plot and store the plot region run in the image memory 30 in the form of bit map data.

Figure 12:
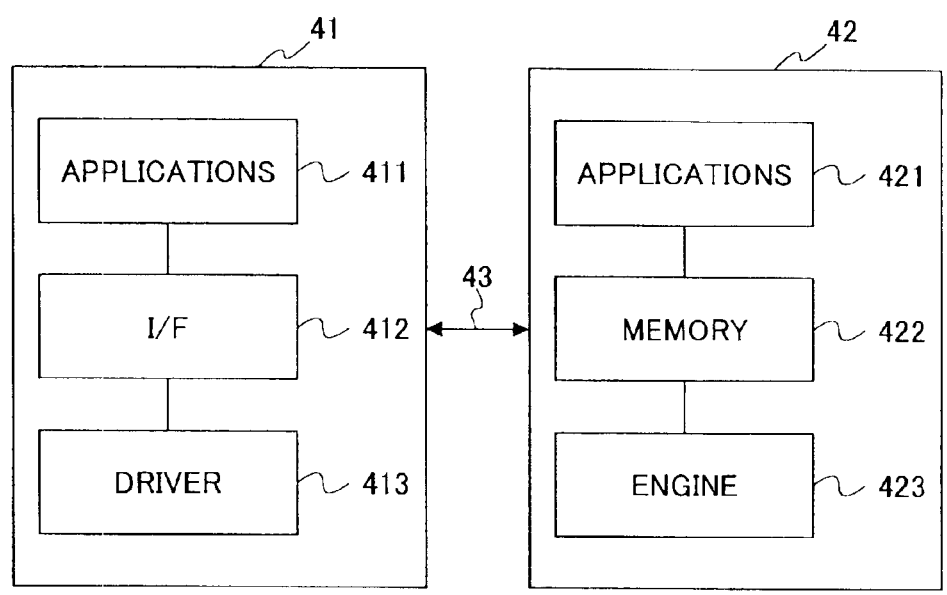
FIG. 12 is a system block diagram showing a computer system to which the image processing method and the image processing apparatus according to the present invention may be applied.

Next, a description will be given of an embodiment of an image output apparatus according to the present invention, by referring to FIG. 12. FIG. 12 is a system block diagram showing a computer system to which the image processing method and the image processing apparatus according to the present invention may be applied.

The computer system shown in FIG. 12 includes a computer 41 and an image output apparatus 42 which are coupled via a connecting means 43. The computer 41 may be formed by a personal computer having a known structure including at least one processor such as a CPU and a computer-readable storage medium such as a storage unit and a memory. The connecting means 43 may be formed by any cable and/or wireless connecting means or, any cable and/or wireless network, which can make the necessary connections between the computer 41 and the image output apparatus 42. The image output apparatus 42 is formed by a printer or a display unit having a known structure including at least one processor such as a CPU and a computer-readable storage medium such as a storage unit and a memory.

The computer 41 includes applications 411 which are executed by the CPU thereof, a graphic interface 412 which outputs a plot instruction responsive to the applications 411, and a driver 413 which outputs image data responsive to the plot instruction. This driver 413 is a printer driver in a case where the image output apparatus 42 is a printer, and is a display driver in a case where the image output apparatus 42 is a display unit.

The image output apparatus 42 includes applications 421 which are executed by the CPU thereof, a memory 422 which stores bit map data of the image data, and an engine 423 which receives the bit map data to be output. The memory 422 may be formed by a portion of the computer-readable storage medium of the image output apparatus 42. The engine 423 is a printer engine in the case where the image output apparatus 42 is a printer, and is a display engine in the case where the image output apparatus 42 is a display unit.

In this embodiment of the image output apparatus, a rasterizing program (computer software) for causing the CPU of the image output apparatus 42 to carrying out the rasterizing process described above is provided in the applications 421. The provision of the rasterizing program in the image output apparatus 42 is effective when the processing capability and speed of the computer 41 are not very high, because the load on the CPU of the computer 41 can be reduced.

Of course, instead of providing the rasterizing program in the image output apparatus 42, it is possible to provide the rasterizing program in the driver 413 within the computer 41. The provision of the rasterizing program in the computer 41 is effective when the processing capability and speed of the computer 41 are high, because the rasterizing process can be carried out at a high speed within the computer 41.

Next, a description will be given of an embodiment of a computer-readable storage medium according to the present invention. In this embodiment of the computer-readable storage medium, the rasterizing program described above is stored in a computer-readable storage medium within the computer 41 or the image output apparatus 42 shown in FIG. 12. In the case where the rasterizing program is stored in the computer-readable storage medium within the computer 41, the computer 41 forms another embodiment of the image processing apparatus according to the present invention.

The computer-readable storage medium may be formed by any recording media capable of storing a computer program, such as semiconductor memory devices, magnetic recording media, optical recording media and magneto-optical recording media such as disks and cards. The computer-readable storage medium may be portable. In other words, the rasterizing program may be provided in a CD-ROM or the like which stores the printer driver or the display driver forming the driver 413.

Therefore, according to the present invention, the line vector forming the path is converted into the line run at an initial stage of the process to make a conversion from the real number coordinates to the integer coordinates, so that the subsequent generation of the region run and the clipping may be made solely by integer computations. As a result, although the amount of real number computations is basically the same as that of the conventional method, the present invention makes the real number computations in one operation at the time when the conversion to the line run is made, and not for every scan line Y-coordinate unit as in the case of the conventional method. For this reason, the image processing as a whole can be carried out at a high speed according to the present invention. Furthermore, the present invention can carry out the clipping at a high speed, because the real number computations such as obtaining intersecting points with respect to the graphic path can be omitted in the present invention.

In addition, the graphic path and the clip path form an arbitrary closed region including a convex type, a concave type and a self-intersecting type by one or a plurality of runs (run set). Hence, each line vector forming the path can be converted independently into the line run, irrespective of the positional relationship of the vectors. For this reason, it is unnecessary to judge the shape, and the image processing can be carried out at a high speed.

Moreover, the line run which is generated inherits the Y-coordinate direction (upward direction, downward direction and horizontal) of the path which is the generating source, as accessory information. As a result, it is possible to improve the general application of the present invention, by enabling the use of a scan line conversion rule using direction.

In addition, the computation process can be carried out at a high speed when generating the region run in the region run generator 25, by sorting all line runs by the starting point Y-coordinates, extracting the line run included in an arbitrary Y-coordinate, sorting the starting point X and the terminating point X of the line run by the starting point X, making the X range definite by an arbitrary scan line conversion rule such as the non-zero winding rule and the even-odd rule, and generating the region run by carrying out these processes with respect to all Y-coordinates.

Furthermore, by using the line run generator 24 and the region run generator 25 in common for both the processing of the graphic path and the processing of the clip path, it is possible to reduce the amount of executing codes and to improve the processing efficiency.

Moreover, by converting a plurality of continuous line vectors having the same Y-coordinate direction into a single line run in the line run generator 24, it is possible to reduce the number of line runs to be processed in the region run generator 25 at the subsequent stage. For this reason, it is possible to carry out the image processing at a high speed.

In addition, it is possible to output graphics and the like at a high speed, by using the image processing apparatus in the image output apparatus such as the printer and the display unit. In this case, the printer may be any type of printer, including laser printers and ink-jet printers. The display unit may be any type of display unit, including cathode ray tubes (CRTs), liquid crystal displays (LCDs), plasma display panels (PDPs) and the like.

Further, the present invention is not limited to these embodiments, but various variations and modifications may be made without departing from the scope of the present invention.

What is claimed is:

1. An image processing method comprising:

a step inputting an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region;

a scan line conversion step converting line vectors of the input graphic path and the input clip path into run sets in dot coordinates passed by the line vectors, and generating a region run describing a closed region represented by the entire path from the run sets, so as to obtain a graphic region run for the graphic path and a clip region run for the clip path; and a clipping step extracting an overlapping portion of the graphic region run and the clip region run, and generating a plot region run for a plot path, said scan line conversion step and said clipping step carrying out a rasterizing process.

2. The image processing method as claimed in claim 1, further comprising:

a plotting step plotting and storing the plot region run in a memory in the form of bit map data according to plot attribute information including colors.

3. The image processing method as claimed in claim 1, wherein said scan line conversion step includes:

a line run generating step converting each straight line of each of the graphic path and the clip path into a line run which is a set of runs described by a starting point and a terminating point of arbitrary Y-coordinates; and a region run generating step generating the region run describing the closed region inside the graphic path according to a specified scan line conversion rule with respect to the arbitrary Y-coordinates including a plurality of line runs.

4. The image processing method as claimed in claim 1, wherein each of the graphic path and the clip path form an arbitrary closed region, including a convex type, a concave type and a self-intersecting type, by one or a plurality of runs.

5. The image processing method as claimed in claim 3, wherein the line run generated by said line run generating step inherits a Y-coordinate direction, including upward direction, downward direction and horizontal, of a path which is a generating source, as accessory information.

6. The image processing method as claimed in claim 3, wherein said region run generating step generates the region run by:

(a) sorting all line runs by starting point Y-coordinates, extracting a line run included in an arbitrary Y-coordinate, (b) sorting a starting point X and a terminating point X of the line run by the starting point X, (c) making an X range definite by an arbitrary scan line conversion rule, and (d) generating the region run by carrying out (a) through (c) with respect to all Y-coordinates.

7. The image processing method as claimed in claim 3, wherein said line run generating step and said region run generating step are used in common for both processing of the graphic path and the processing of the clip path.

8. The image processing method as claimed in claim 3, wherein said line run generating step converts a plurality of continuous line vectors having the same Y-coordinate direction into a single line run.

9. An image processing apparatus comprising:

an input section inputting an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region;

a scan line conversion section converting line vectors of the input graphic path and the input clip path into run sets in dot coordinates passed by the line vectors, and generating a region run describing a closed region represented by the entire path from the run sets, so as to obtain a graphic region run for the graphic path and a clip region run for the clip path; and a clip section extracting an overlapping portion of the graphic region run and the clip region run, and generating a plot region run for a plot path, said scan line conversion section and said clip section carrying out a rasterizing process.

10. The image processing apparatus as claimed in claim 9, further comprising:

a memory; and a plot section plotting and storing the plot region run in the memory in the form of bit map data according to plot attribute information including colors.

11. The image processing apparatus as claimed in claim 9, wherein said scan line conversion section includes:

a line run generator converting each straight line of each of the graphic path and the clip path into a line run which is a set of runs described by a starting point and a terminating point of arbitrary Y-coordinates; and a region run generator generating the region run describing the closed region inside the graphic path according to a specified scan line conversion rule with respect to the arbitrary Y-coordinates including a plurality of line runs.

12. The image processing apparatus as claimed in claim 9, wherein each of the graphic path and the clip path form an arbitrary closed region, including a convex type, a concave type and a self-intersecting type, by one or a plurality of runs.

13. The image processing apparatus as claimed in claim 11, wherein the line run generated by said line run generator inherits a Y-coordinate direction, including upward direction, downward direction and horizontal, of a path which is a generating source, as accessory information.

14. The image processing apparatus as claimed in claim 11, wherein said region run generator includes:

a first means for sorting all line runs by starting point Y-coordinates, extracting a line run included in an arbitrary Y-coordinate, a second means for sorting a starting point X and a terminating point X of the line run by the starting point X, a third means for making an X range definite by an arbitrary scan line conversion rule, and a fourth means for generating the region run by carrying out processes of the first through third means with respect to all Y-coordinates.

15. The image processing apparatus as claimed in claim 11, wherein said line run generator and said region run generator are used in common for both processing of the graphic path and the processing of the clip path.

16. The image processing apparatus as claimed in claim 11, wherein said line run generator converts a plurality of continuous line vectors having the same Y-coordinate direction into a single line run.

17. An image output apparatus comprising:

an input section inputting an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region;

a scan line conversion section converting line vectors of the input graphic path and the input clip path into run sets in dot coordinates passed by the line vectors, and generating a region run describing a closed region represented by the entire path from the run sets, so as to obtain a graphic region run for the graphic path and a clip region run for the clip path;

a clip section extracting an overlapping portion of the graphic region run and the clip region run, and generating a plot region run for a plot path, said scan line conversion section and said clip section carrying out a rasterizing process;

a memory; and a plot section plotting and storing the plot region run in the memory in the form of bit map data according to plot attribute information including colors, as output image data.

18. The image output apparatus as claimed in claim 17, wherein said scan line conversion section includes:

a line run generator converting each straight line of each of the graphic path and the clip path into a line run which is a set of runs described by a starting point and a terminating point of arbitrary Y-coordinates; and a region run generator generating the region run describing the closed region inside the graphic path according to a specified scan line conversion rule with respect to the arbitrary Y-coordinates including a plurality of line runs.

19. The image output apparatus as claimed in claim 18, wherein each of the graphic path and the clip path form an arbitrary closed region, including a convex type, a concave type and a self-intersecting type, by one or a plurality of runs.

20. The image output apparatus as claimed in claim 18, wherein the line run generated by said line run generator inherits a Y-coordinate direction, including upward direction, downward direction and horizontal, of a path which is a generating source, as accessory information.

21. The image output apparatus as claimed in claim 18, wherein said region run generator includes:

a first means for sorting all line runs by starting point Y-coordinates, extracting a line run included in an arbitrary Y-coordinate, a second means for sorting a starting point X and a terminating point X of the line run by the starting point X, a third means for making an X range definite by an arbitrary scan line conversion rule, and a fourth means for generating the region run by carrying out processes of the first through third means with respect to all Y-coordinates.

22. The image output apparatus as claimed in claim 18, wherein said line run generator and said region run generator are used in common for both processing of the graphic path and the processing of the clip path.

23. The image output apparatus as claimed in claim 18, wherein said line run generator converts a plurality of continuous line vectors having the same Y-coordinate direction into a single line run.

24. A computer-readable storage medium which stores a program for causing a computer to carrying out an image processing, said program comprising:

a procedure causing the computer to input an input graphic path indicating a shape of a graphic to be plotted, and an input clip path indicating a shape of a plot effective range, each path being represented by a vector set of a plurality of straight lines connected at end points such that one path is formed by connecting a starting point of a first straight line and a terminating point of a last straight line to describe an arbitrary polygonal closed region;

a scan line conversion procedure causing the computer to convert line vectors of the input graphic path and the input clip path into run sets in dot coordinates passed by the line vectors, and generate a region run describing a closed region represented by the entire path from the run sets, so as to obtain a graphic region run for the graphic path and a clip region run for the clip path; and a clipping procedure causing the computer to extract an overlapping portion of the graphic region run and the clip region run, and generate a plot region run for a plot path, said scan line conversion procedure and said clipping procedure causing the computer to carry out a rasterizing process.

25. The computer-readable storage medium as claimed in claim 24, further comprising:

a plotting procedure causing the computer to plot and store the plot region run in a memory in the form of bit map data according to plot attribute information including colors.

26. The computer-readable storage medium as claimed in claim 24, wherein said scan line conversion procedure includes:

a line run generating procedure causing the computer to convert each straight line of each of the graphic path and the clip path into a line run which is a set of runs described by a starting point and a terminating point of arbitrary Y-coordinates; and a region run generating procedure causing the computer to generate the region run describing the closed region inside the graphic path according to a specified scan line conversion rule with respect to the arbitrary Y-coordinates including a plurality of line runs.

27. The computer-readable storage medium as claimed in claim 24, wherein each of the graphic path and the clip path form an arbitrary closed region, including a convex type, a concave type and a self-intersecting type, by one or a plurality of runs.

28. The computer-readable storage medium as claimed in claim 26, wherein the line run generated by said line run generating procedure causes the computer to inherit a Y-coordinate direction, including upward direction, downward direction and horizontal, of a path which is a generating source, as accessory information.

29. The computer-readable storage medium as claimed in claim 26, wherein said region run generating procedure causes the computer to generates the region run by:

(a) sorting all line runs by starting point Y-coordinates, extracting a line run included in an arbitrary Y-coordinate, (b) sorting a starting point X and a terminating point X of the line run by the starting point X, (c) making an X range definite by an arbitrary scan line conversion rule, and (d) generating the region run by carrying out (a) through (c) with respect to all Y-coordinates.

30. The computer-readable storage medium as claimed in claim 26, wherein said line run generating procedure and said region run generating procedure are used in common for both processing of the graphic path and the processing of the clip path.

31. The computer-readable storage medium as claimed in claim 26, wherein said line run generating procedure causes the computer to convert a plurality of continuous line vectors having the same Y-coordinate direction into a single line run.

* * * * *